United States Patent [19]

Kawata

[11] Patent Number: 4,860,432

[45] Date of Patent: Aug. 29, 1989

[54] METHOD OF MANUFACTURING A MAGNETORESISTIVE SENSOR

[75] Inventor: Sadao Kawata, Koide, Japan

[73] Assignee: Alps Electric Co., Ltd., Japan

[21] Appl. No.: 190,770

[22] Filed: May 6, 1988

Related U.S. Application Data

[63] Continuation-in-part of Ser. No. 42,379, Apr. 24, 1987.

[30] Foreign Application Priority Data

Sep. 2, 1986 [JP] Japan ................. 61-134706

[51] Int. Cl.$^4$ .............................................. H01F 7/06
[52] U.S. Cl. .................................................. 29/602.1
[58] Field of Search ............... 29/602.1, 603; 324/208, 324/252; 338/32 R

[56] References Cited

U.S. PATENT DOCUMENTS

| | | | |
|---|---|---|---|
| 4,639,807 | 1/1987 | Sekizawa et al. | 324/252 X |
| 4,759,119 | 7/1988 | Noguchi | 29/418 X |
| 4,786,870 | 11/1988 | Kawamata et al. | 324/208 |

Primary Examiner—Timothy V. Eley
Attorney, Agent, or Firm—Guy W. Shoup; Paul J. Winters

[57] ABSTRACT

In a method of manufacturing a magnetic sensor by etching a ferromagnetic film on a substrate with an etching solution to form a plurality of magnetoresistive elements of a given width disposed in a row in parallel with each other on the substrate, wherein the magnetoresistive elements are connected by bridge circuits so that the magnetic sensor can be used in proximity to a rotating magnetic member to detect rotation information based upon changes in electrical resistance in the magnetoresistive elements, the improvement comprising the steps of etching the ferromagnetic film to form dummy elements outwardly of each end of the row of magnetoresistive elements so as to allow all of the magnetoresistive elements to be formed of a uniform width by preventing the magnetoresistive elements at each end of the row from being affected by etching solution collected in the spaces outwardly of the ends of the row; where the etching of the dummy elements occurs simultaneously with the etching of the magnetoresistive elements.

3 Claims, 3 Drawing Sheets

METHOD OF MANUFACTURING A MAGNETORESISTIVE SENSOR

This patent application is a continuation-in-part of copending application Ser. No. 042,379, filed Apr. 24, 1987.

BACKGROUND OF THE INVENTION (a) Field of the invention

The present invention relates to a magnetic sensor and more particularly, it relates to a magnetic sensor for detecting rotation information such as the rotating speed and the position of a rotating body with the use of magnetoresistance effect elements.

(b) Prior Art

Rotary encoders with the output of digital quantity sensors which detect rotating positions or rotating speed of rotating bodies such as drums or discs are in demand, especially among these encoders, magnetic encoders utilizing magnetoresistance effect elements which have high sensitivity, excellent frequency characteristics, and simple construction are considered to have a bright future as magnetic sensors.

The magnetic sensor utilizing the magnetoresistance effect elements comprises eight magnetoresistance effect elements which are formed into strips and disposed in parallel to each other on a substrate made of glass or the like, wherein each group consisting of four elements forms a bridge circuit. When the magnetic sensor thus constituted is arranged in close proximity to a rotating body, for example, a rotating surface of a drum on which magnetic signals are recorded, the electric resistance of magnetoresistance effect elements of the magnetic sensor is changed according to the change of the magnetic field caused by the rotating body, so that rotation information signals based on the change of the electric resistance can be obtained from abovementioned bridge circuits.

As described above, eight strip-shaped magnetoresistance effect elements arranged in parallel to each other constitute the magnetic sensor, and these elements are formed, for example, as shown in FIG. 3 (a) in a method wherein an element layer 2 is formed with a film of a ferromagnetic substance such as Permalloy on a substrate 1 to constitute magnetoresistance effect elements and after that as shown in FIG. 2 (b) eight pieces of magnetoresistance effect elements 3 are formed in strip shapes on the substrate 1 by photo-etching.

When eight pieces of magnetoresistance effect elements are formed in parallel to each other on the substrate 1 by etching, both sides of these eight pieces of magnetoresistance effect elements are left as wide spaces and etching solution is collected in these areas. The collected solution affects the magnetoresistance effect elements on both sides, and the width of the magnetoresistance effect elements on both sides are formed thinner than other elements. Consequently, resistance values of the magnetoresistance effect elements on both sides are made to be higher than those of other elements. It prevents the forming of the magnetoresistance effect elements with uniform resistance values and so it is necessary to adjust the resistance values of these elements on both sides with the use of a variable resistor etc. Such additional adjustment work is uneconomical requiring longer time for adjustment and also troublesome.

SUMMARY OF INVENTION

The present invention is therefore intended to eliminate the above-mentioned drawbacks.

Accordingly, the object of the present invention is to provide a magnetic sensor which utilizes the plural number of magnetoresistance effect elements of uniform resistance values.

The object of the present invention can be achieved by a magnetic sensor which has the plural number of magnetoresistance effect elements disposed in parallel to each other and located in close proximity to a rotating magnetic field, and detects rotation information based on the change of the electric resistance of said magnetoresistance effect elements which respond to the change of said magnetic field, and is so constituted that dummy elements are disposed in parallel on both sides of said plural number of magnetoresistance effect elements disposed in parallel to each other for the purpose of making the resistance values of the magnetoresistance effect elements uniform.

DETAILED DESCRIPTION OF THE PREFERRED EMBODIMENT

Figure 1:
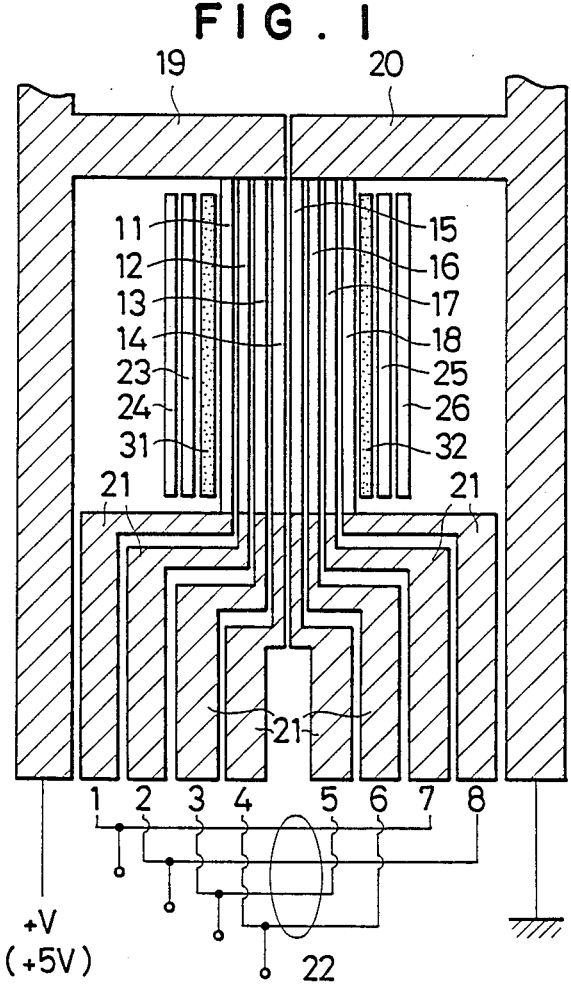
FIG. 1 is a plan view of a magnetic sensor relating to an embodiment of the present invention.

Following is the description of an embodiment of the present invention referring to the drawings.

Figure 2:
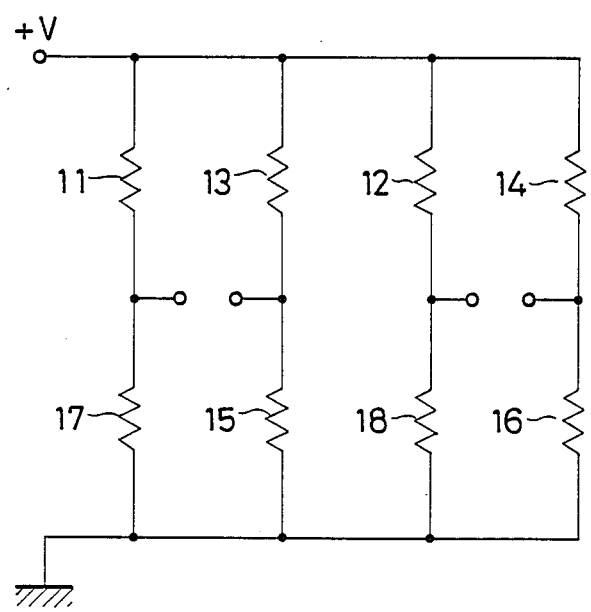
FIG. 2 is a circuit diagram of a bridge circuit consisting of magnetoresistance effect elements.

FIG. 1 is a plan view of a magnetic sensor relating to an embodiment of the present invention. The magnetic sensor shown in this drawing has eight strip-shaped magnetoresistance effect elements from 11 through 18 disposed in parallel to each other. These magnetoresistance effect elements from 11 through 18 are, as mentioned above (refer to FIGS. 3 (a), (b)), formed on a substrate made of, for example, glass by etching. The magnetoresistance effect elements from the first through the fourth from 11 through 14 are, at their both ends, connected to conductors 19 and 21, which are made of aluminum or copper, and connected to an electric power supply of +5 V through said conductor 19, and the both ends of the magnetoresistance effect elements from the fifth through the eighth from 15 through 18 are similarly connected conductors 20 and 21, and connected to earth through said conductor 20. These conductors are connected to each other with a lead wire 22, so that the other end of the first magnetoresistance effect element 11 is connected to the other end of the seventh magnetoresistance effect element 17; the other end of the second magnetoresistance effect element 12 is connected to the other end of the eighth magnetoresistance effect element 18; the other end of the third magnetoresistance effect element 13 is connected to the other end of the fifth magnetoresistance effect element 15; the other end of the fourth magnetoresistance 14 is connected to the other end of the sixth magnetoresistance effect element 16. Thus two units of bridge circuits are formed between a voltage of +5 V and earth as shown in FIG. 2.

Dummy elements 23 and 24, and 25 and 26 of the same strip shape as the regular elements are disposed in parallel to each other on both sides of eight magnetoresistance effect elements from 11 through 18.

When a magnetic sensor constituted as mentioned above is disposed in the close proximity to a rotating surface of a rotating body, for example a drum, on which magnetic signals are recorded, each magnetoresistance effect element from 11 through 18 is influenced by the change of the magnetic field caused by magnetic signals recorded on the rotating body and therefore the electric resistance of each element is changed. Accordingly, electric signals based on the change of the electric resistance of each magnetoresistance effect element can be output from the bridge circuits, so that the rotation information of a rotating body, that is the rotating position or rotating speed, can be obtained.

Figure 3A:
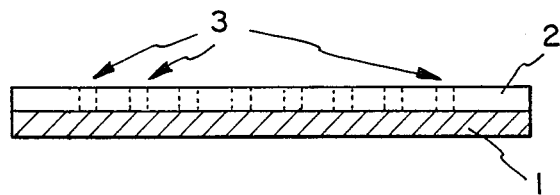
FIGS. 3 (a), (b) are cross sectional views showing a manufacturing method of a magnetoresistance effect element.
Figure 3B:
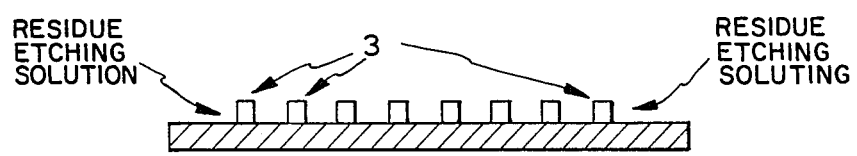

The magnetic sensor constituted as described above is provided with dummy elements 23 and 24, and 25 and 26 on both sides of eight magnetoresistance effect elements from 11 through 18, so that when magnetoresistance effect elements are formed on a substrate by etching as shown in FIG. 3 owing to the arrangement of dummy elements on both sides of magnetoresistance effect elements from 11 through 18 the influence of collected etching solution in the wide areas on both sides of magnetoresistance effect elements does not affect the magnetoresistance effect elements on both sides directly, and the influence affects dummy elements. As the result, dummy elements can be thin affected by etching solution, but the magnetoresistance effect elements are not affected and all eight elements can be formed into the same dimensions. Therefore resistance values of all magnetoresistance effect elements are uniformly formed without any deviation. Thus there is no need of fine adjustment with a variable resistor, and circuits are simplified, so that assembling and adjusting processes are simplified. Owing to these facts economical efficiency is much improved.

When a bridge circuit is formed, if the difference in resistance values between two magnetoresistance effect elements is less than ±0.5% a variable resistor is not needed. The yield of conforming articles has been about 60%, but in the case of this rotation information detector is used it goes up to 90%, and so in most cases variable resistors are not needed.

On both sides of the eight magnetoresistance effect elements from 11 through 18 boundary patterns 31 and 32 of the same strip shape made of, for example, copper are disposed in parallel to each other, and further on both sides of the boundary patterns dummy elements 23 and 24, and 25 and 26 of the same strip shape are disposed in parallel.

Said dummy elements 23 and 24, and 25 and 26, as described above, have the role of preventing magnetoresistance effect elements being affected by a lot of etching solution in the wide areas on both sides of magnetoresistance effect elements, and the boundary patterns 31 and 32 are provided for the purpose of discriminating a magnetoresistance effect element from a dummy element.

In other words, the boundary pattern 31 is prepared to clarify the difference between dummy elements 23 and 24, and magnetoresistance effect elements from 11 through 14, and the boundary pattern 32 is prepared to clarify the difference between dummy elements 25 and 26, and magnetoresistance effect elements from 15 through 18.

Boundary patterns 31 and 32 are, as mentioned above, made of copper and so the color is different from that of magnetoresistance effect elements or dummy elements made of Permalloy, so that they can be discriminated clearly from each other. Therefore, in the case of visual inspection of magnetoresistance effect elements, it is certainly judged if an element is a magnetoresistance effect element or a dummy element by its position, that is on which side of the boundary patterns 31 and 32 is the element located, so that the time spent in visual inspection is decreased and manufacturing efficiency is upgraded.

Boundary patterns 31 and 32, and conductors 19, 20 and 21 made of copper etc. are formed simultaneously, so that even if boundary patterns 31 and 32 are added the manufacturing process is kept unchanged.

According to the present invention as described above, on both sides of the plural number of magnetoresistance effect elements dummy elements are disposed and so when the magnetoresistance effect elements are formed, for example, by etching, a lot of etching solution existing in the space on both sides of magnetoresistance effect elements does not affect magnetoresistance effect elements directly mitigated by dummy elements, so that it does not occur that the magnetoresistance effect elements on both sides are formed thinner than other ones, and all elements are formed uniformly, accordingly the resistance values of magnetoresistance effect elements are also formed uniformly. As a consequence, circuits are simplified and there is no need of fine adjustment with the use of a variable resistor, which simplified the processes of assembling and adjustment. Thus economical efficiency in manufacturing is improved. Furthermore, according to the present invention, boundary patterns which have different color from that of magnetoresistance effect elements or dummy elements are interposed between magnetoresistance effect elements and dummy elements, which makes these two kinds of elements be clearly discriminated. It decreased the time required for visual inspection, and the efficiency of visual inspection is improved.

I claim:

1. In a method of manufacturing a magnetic sensor by etching a ferromagnetic film on a substrate with an etching solution to form a plurality of magnetoresistive elements of a given width disposed in a row in parallel with each other on the substrate, wherein said magnetoresistive elements are connected by bridge circuits so that the magnetic sensor can be used in proximity to a rotating magnetic member to detect rotation information based upon changes in electrical resistance in the magnetoresistive elements, the improvement comprising the steps of:
etching said ferromagnetic film to form dummy elements outwardly of each end of said row of magnetoresistive elements so as to allow all of said magetoresistive elements to be formed of a uniform width by preventing the magnetoresistive elements at each end of said row from being affected by etching solution collected in the spaces outwardly of the ends of said row; where said etching of said dummy elements occurs simultaneously with said etching of said magnetoresistive elements.

2. A method according to claim 1, wherein eight magnetoresistive elements are formed in said row and at least two dummy elements are disposed outwardly of each end of said row.

3. A method according to claim 2, wherein a boundary pattern of a different color than said dummy and magnetoresistive elements is interposed on each end between said dummy elements and said magnetoresistive elements to facilitate visual discrimination between said elements.

* * * * *